(12) United States Patent
Thimmannagari et al.

(10) Patent No.: US 7,080,237 B2
(45) Date of Patent: Jul. 18, 2006

(54) REGISTER WINDOW FLATTENING LOGIC FOR DEPENDENCY CHECKING AMONG INSTRUCTIONS

(75) Inventors: Chandra M. R. Thimmannagari, Fremont, CA (US); Sorin Iacobovici, San Jose, CA (US); Rabin A. Sugumar, Sunnyvale, CA (US); Robert Nuckolls, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 389 days.

(21) Appl. No.: 10/155,391

(22) Filed: May 24, 2002

(65) Prior Publication Data

US 2003/0221088 A1    Nov. 27, 2003

(51) Int. Cl.
*G06F 9/30* (2006.01)
(52) U.S. Cl. .................... 712/220; 712/216
(58) Field of Classification Search ............... 712/220, 712/216, 228
See application file for complete search history.

(56) References Cited

U.S. PATENT DOCUMENTS

| | | | | |
|---|---|---|---|---|
| 5,799,166 A | * | 8/1998 | Leung | 712/216 |
| 5,870,597 A | * | 2/1999 | Panwar et al. | 712/230 |
| 6,230,317 B1 | * | 5/2001 | Wu | 717/161 |

* cited by examiner

*Primary Examiner*—Henry W. H. Tsai
*Assistant Examiner*—Tonia L. Meonske
(74) *Attorney, Agent, or Firm*—Osha Liang LLP

(57) ABSTRACT

A technique for flattening architectural register windows into flattened space depending on a current window pointer to a register window is provided. The technique involves converting an n-bit value of a particular register in a register window to an x-bit value dependent on the current window pointer, where x is greater than n, and where the x-bit value is used for register dependency checking among a plurality of instructions.

5 Claims, 8 Drawing Sheets

| | unflattened (5-bit rs1/rs2/rd) | flattened (decimal) | flattened (binary) |
|---|---|---|---|
| Global Registers<br>PSTATE.AG=0,<br>PSTATE.MG=0,<br>PSTATE.IG=0 | r7 | 7 | 0 000 111 |
| | r6 | 6 | 0 000 110 |
| | r5 | 5 | 0 000 101 |
| | r4 | 4 | 0 000 100 |
| | r3 | 3 | 0 000 011 |
| | r2 | 2 | 0 000 010 |
| | r1 | 1 | 0 000 001 |
| | r0 | 0 | 0 000 000 |
| Alternate Global Registers<br>PSTATE.AG=1,<br>PSTATE.MG=0,<br>PSTATE.IG=0 | r7 | 15 | 0 001 111 |
| | r6 | 14 | 0 001 110 |
| | r5 | 13 | 0 001 101 |
| | r4 | 12 | 0 001 100 |
| | r3 | 11 | 0 001 011 |
| | r2 | 10 | 0 001 010 |
| | r1 | 9 | 0 001 001 |
| | r0 | 8 | 0 001 000 |
| MMU Global Registers<br>PSTATE.AG=0,<br>PSTATE.MG=1,<br>PSTATE.IG=0 | r7 | 23 | 0 010 111 |
| | r6 | 22 | 0 010 110 |
| | r5 | 21 | 0 010 101 |
| | r4 | 20 | 0 010 100 |
| | r3 | 19 | 0 010 011 |
| | r2 | 18 | 0 010 010 |
| | r1 | 17 | 0 010 001 |
| | r0 | 16 | 0 010 000 |
| Interrupt Global Registers<br>PSTATE.AG=0,<br>PSTATE.MG=0,<br>PSTATE.IG=1 | r7 | 31 | 0 011 111 |
| | r6 | 30 | 0 011 110 |
| | r5 | 29 | 0 011 101 |
| | r4 | 28 | 0 011 100 |
| | r3 | 27 | 0 011 011 |
| | r2 | 26 | 0 011 010 |
| | r1 | 25 | 0 011 001 |
| | r0 | 24 | 0 011 000 |

*FIGURE 5a*

| | unflattened (5-bit rs1/rs2/rd) | flattened (decimal) | flattened (binary) |
|---|---|---|---|
| CWP=4 or CWP=0 | r15 / r31 | 39 | 0 100 111 |
| | r14 / r30 | 38 | 0 100 110 |
| | r13 / r29 | 37 | 0 100 101 |
| | r12 / r28 | 36 | 0 100 100 |
| | r11 / r27 | 35 | 0 100 011 |
| | r10 / r26 | 34 | 0 100 010 |
| | r9 / r25 | 33 | 0 100 001 |
| | r8 / r24 | 32 | 0 100 000 |
| CWP=0 | r23 | 47 | 0 101 111 |
| | r22 | 46 | 0 101 110 |
| | r21 | 45 | 0 101 101 |
| | r20 | 44 | 0 101 100 |
| | r19 | 43 | 0 101 011 |
| | r18 | 42 | 0 101 010 |
| | r17 | 41 | 0 101 001 |
| | r16 | 40 | 0 101 000 |
| CWP=0 or CWP=1 | r15 / r31 | 55 | 0 110 111 |
| | r14 / r30 | 54 | 0 110 110 |
| | r13 / r29 | 53 | 0 110 101 |
| | r12 / r28 | 52 | 0 110 100 |
| | r11 / r27 | 51 | 0 110 011 |
| | r10 / r26 | 50 | 0 110 010 |
| | r9 / r25 | 49 | 0 110 001 |
| | r8 / r24 | 48 | 0 101 000 |
| CWP=1 | r23 | 63 | 0 111 111 |
| | r22 | 62 | 0 111 110 |
| | r21 | 61 | 0 111 101 |
| | r20 | 60 | 0 111 100 |
| | r19 | 59 | 0 111 011 |
| | r18 | 58 | 0 111 010 |
| | r17 | 57 | 0 111 001 |
| | r16 | 56 | 0 111 000 |
| CWP=1 or CWP=2 | r15 / r31 | 71 | 1 000 111 |
| | r14 / r30 | 70 | 1 000 110 |
| | r13 / r29 | 69 | 1 000 101 |
| | r12 / r28 | 68 | 1 000 100 |
| | r11 / r27 | 67 | 1 000 011 |
| | r10 / r26 | 66 | 1 000 010 |
| | r9 / r25 | 65 | 1 000 001 |
| | r8 / r24 | 64 | 1 000 000 |
| CWP=2 | r23 | 79 | 1 001 111 |
| | r22 | 78 | 1 001 110 |
| | r21 | 77 | 1 001 101 |
| | r20 | 76 | 1 001 100 |
| | r19 | 75 | 1 001 011 |
| | r18 | 74 | 1 001 010 |
| | r17 | 73 | 1 001 001 |
| | r16 | 72 | 1 001 000 |
| CWP=2 or CWP=3 | r15 / r31 | 87 | 1 010 111 |
| | r14 / r30 | 86 | 1 010 110 |
| | r13 / r29 | 85 | 1 010 101 |
| | r12 / r28 | 84 | 1 010 100 |
| | r11 / r27 | 83 | 1 010 011 |
| | r10 / r26 | 82 | 1 010 010 |
| | r9 / r25 | 81 | 1 010 001 |
| | r8 / r24 | 80 | 1 010 000 |
| CWP=3 | r23 | 95 | 1 011 111 |
| | r22 | 94 | 1 011 110 |
| | r21 | 93 | 1 011 101 |
| | r20 | 92 | 1 011 100 |
| | r19 | 91 | 1 011 011 |
| | r18 | 90 | 1 011 010 |
| | r17 | 89 | 1 011 001 |
| | r16 | 88 | 1 011 000 |
| CWP=3 or CWP=4 | r15 / r31 | 103 | 1 100 111 |
| | r14 / r30 | 102 | 1 100 110 |
| | r13 / r29 | 101 | 1 100 101 |
| | r12 / r28 | 100 | 1 100 100 |
| | r11 / r27 | 99 | 1 100 011 |
| | r10 / r26 | 98 | 1 100 010 |
| | r9 / r25 | 97 | 1 100 001 |
| | r8 / r24 | 96 | 1 100 000 |
| CWP=4 | r23 | 111 | 1 101 111 |
| | r22 | 110 | 1 101 110 |
| | r21 | 109 | 1 101 101 |
| | r20 | 108 | 1 101 100 |
| | r19 | 107 | 1 101 011 |
| | r18 | 106 | 1 101 010 |
| | r17 | 105 | 1 101 001 |
| | r16 | 104 | 1 101 000 |

*FIGURE 5b*

I=10010
CWP=00001

REGISTER WINDOW FLATTENING LOGIC FOR DEPENDENCY CHECKING AMONG INSTRUCTIONS

BACKGROUND OF INVENTION

A typical computer system includes at least a microprocessor and some form of memory. The microprocessor has, among other components, arithmetic, logic, and control circuitry that interpret and execute instructions necessary for the operation and use of the computer system. FIG. 1 shows a typical computer system 10 having a microprocessor 12, memory 14, integrated circuits 16 that have various functionalities, and communication paths 18, i.e., buses and signals, that are necessary for the transfer of data among the aforementioned components of the computer system 10.

A microprocessor, such as the one shown in FIG. 1, typically includes an integer unit and a floating point-unit, each with its own registers. This organization allows for implementations with concurrency between integer and floating-point instruction execution. Typically, the integer unit contains general-purpose registers and controls the overall operation of the microprocessor. The integer unit executes the integer arithmetic instructions and computes memory addresses for loads and stores. The integer unit also maintains the program counter and controls instruction execution for the floating-point unit.

In an exemplary implementation of an integer unit, the integer unit may contain 64 to 528 general-purpose 64-bit r registers (an r register is an integer register and is also known in the art as a "general-purpose register" or "working register"). They are partitioned into 8 global registers, 8 alternate global registers, plus an implementation-dependent number of 16-register sets. As shown in Table 1, a "register window" consists of the current 8 in registers, 8 local registers, and 8 out registers.

TABLE 1

Window Addressing

| Windowed Register Address | r Register Address |
|---|---|
| in[0]–in[7] | r[24]–r[31] |
| local[0]–local[7] | r[16]–r[23] |
| out[0]–out[7] | r[8]–r[15] |
| global[0]–global[7] | r[0]–r[7] |

Registers r[0]–r[7] refer to a set of eight registers called the global registers, g0–g7. At any given time, one of four sets of eight registers is enabled and can be accessed as the global registers. Which set of global registers is currently enabled is selected by an alternate global (AG, MG, GG, or IG) field in a processor stage register (PSTATE). Global register zero, g0, typically reads a zero, i.e., writes to it have no program-visible effect.

At any time, an instruction may access the 8 global registers and a 24-register window into the r registers. A register window comprises the 8 in and 8 local registers of a particular register set together with the 8 in registers of an adjacent register set, which are addressable from the current window as out registers.

As an example of register windowing, FIG. 2 shows a 5 register window architecture 20. As those skilled in the art will understand, although FIG. 2 shows a 5 register window scheme, the number of windows or register sets is implementation-dependent. The total number of r registers in a given implementation is 8 (for the global registers), plus 8 (for the alternate global registers), plus the number of sets multiplied by 16 registers/set.

A current window into the r registers is given by the current window pointer (CWP) register. The CWP is decremented by a RESTORE/RETURN instruction and is incremented by a SAVE/STORE instruction. Window overflow is detected via a CANSAVE register and window underflow is detected via a CANRESTORE register. More specifically, the CANSAVE register contains the number of register windows following CWP that are not in use and are available to be allocated by a SAVE instruction. The CANRESTORE register contains the number of register windows preceding CWP that are in use by the current program and can be restored via the RESTORE instruction.

Additionally, state registers OTHERWIN and CLEANWIN may be used in some register window schemes. The OTHERWIN register contains the count of register windows that will be spilled/filled using a particular set of trap vectors. When all of the register windows fill and another register window is saved, a register window overflow, or "spill" occurs, in which case some number of registers are saved to the program stack. Alternatively, when restoring a register window that is not already in a register window, a register window underflow, or "fill" occurs, in which case some number of register windows are restored from the program stack. In some implementations, the OTHERWIN register may be used to split the register windows among different address spaces and handle spill/fill traps using separate spill/fill vectors. The CLEANWIN register counts the number of registers that are "clean" with respect to the current program. That is, register windows that contain only zeroes, valid addresses, or valid data from that program are counted. Registers in these windows need not be cleaned before they are used. The count includes the register windows that can be restored (the value in the CANRESTORE register) and the register windows following CWP that can be used without cleaning.

As discussed above, each window shares its ins with one adjacent window and its outs with another. The outs of the CWP−1 window are addressable as the ins of the current window, and the outs in the current window are the ins of the CWP+1 window. The locals are unique to each window. When one function, or subroutine, calls another, the callee may choose to execute a SAVE instruction. This instruction increments CWP, shifting the register window upward. The caller's out registers then become the callee's in registers, and the callee gets a new set of local and out registers for its own use. Only the CWP changes because the registers and return address do not need to be stored on a stack. The CALL instruction automatically saves its own address in, for example, out register 7, which becomes in register 7 if CWP is incremented. Therefore, the callee may access the return address whether or not it has decremented CWP.

An r register with address o, where $8 \leq o \leq 15$, refers to exactly the same register as address (o+16) does after the CWP is incremented by 1. Likewise, a register with address I, where $24 \leq o \leq 31$, refers to exactly the same register as address (o−16) does after the CWP is decremented by 1. For a high level view of register dependency in a register window implementation, refer to FIG. 3, which shows a circular stack 30 of windowed r registers for an implementation using an 8 register window scheme.

SUMMARY OF INVENTION

According to one aspect of the present invention, a method for processing a plurality of instructions in a computer system comprises: flattening an n-bit value of a first register in a register window into an x-bit value, where x is greater than n, and where the x-bit value corresponds to the first register; flattening a p-bit value of a second register in the register window into a q-bit value, where q is greater than p, and where the q-bit value corresponds to the second register; and checking a register dependency among the plurality of instructions using the x-bit value and the q-bit value.

According to another aspect, a method for processing a plurality of instructions in a computer system comprises: a step for flattening an n-bit value of a first register in a register window into an x-bit value, where x is greater than n, and where the x-bit value corresponds to the first register; a step for flattening a p-bit value of a second register in the register window into a q-bit value, where q is greater than p, and where the q-bit value corresponds to the second register; and a step for register dependency checking among the plurality of instructions using the x-bit value and the q-bit value.

According to another aspect, a computer system comprises: a processor; a memory; and instructions, residing in the processor and executable on the processor, for flattening an n-bit value of a register in a register window into an x-bit value, where x is greater than n, and where the x-bit value corresponds to the register.

According to another aspect, a computer-readable medium having recorded therein instructions executable by processing, where the instructions are for: flattening an n-bit value of a first register in a register window into an x-bit value, where x is greater than n, and where the x-bit value corresponds to the first register; flattening a p-bit value of a second register in the register window into a q-bit value, where q is greater than p, and where the q-bit value corresponds to the second register; and register dependency checking among the plurality of instructions using the x-bit value and the q-bit value.

According to another aspect, an integrated circuit comprises: a register having an n-bit value, where the register is part of a register window; and circuitry that converts the n-bit value to an x-bit value dependent on the n-bit value and a current window pointer to the register window, where x is greater than n.

Other aspects and advantages of the invention will be apparent from the following description and the appended claims.

BRIEF DESCRIPTION OF DRAWINGS

FIGS. 5a and 5b show an exemplary register space in accordance with an embodiment of the present invention.

DETAILED DESCRIPTION

In some microprocessor implementations, register dependency checking among instructions becomes difficult because of register windowing. In other words, in implementations using register windows, checking for dependencies among instructions is adversely affected by the interrelationship of particular registers in the register window scheme. To facilitate improved register dependency checking, embodiments of the present invention relate to architectural registers within an instruction that are flattened into flattened space before register dependency checking occurs.

Particularly, the present invention uses a working copy of the CWP to facilitate the flattening, where the flattening is conducted using flattener logic implemented with logic gates. The CWP is implementation specific and when incremented, allows a subroutine to make use of a new set of registers. CWP gets incremented/decremented by SAVE/RESTORE/RETURN instructions. When a subroutine wants to make use of a new set of registers, the subroutine inserts a SAVE instruction within its code.

Figure 1:
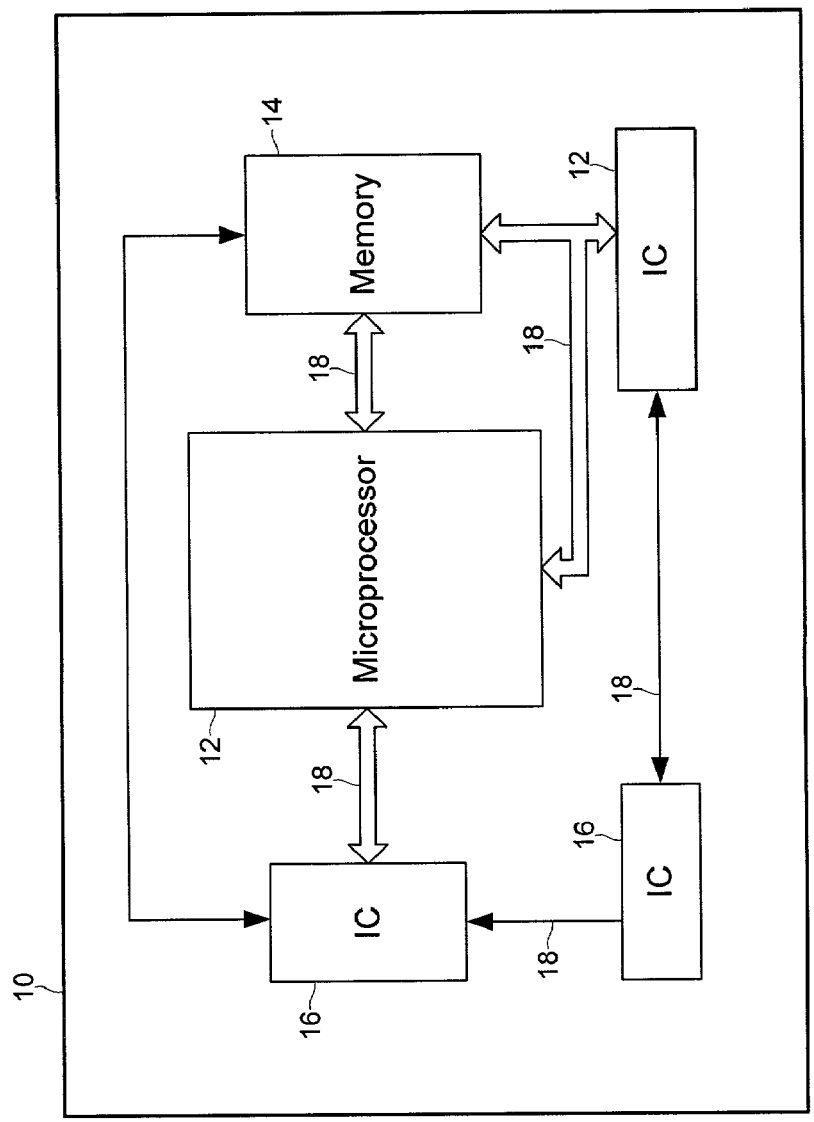
FIG. 1 shows a typical computer system.
Figure 2:
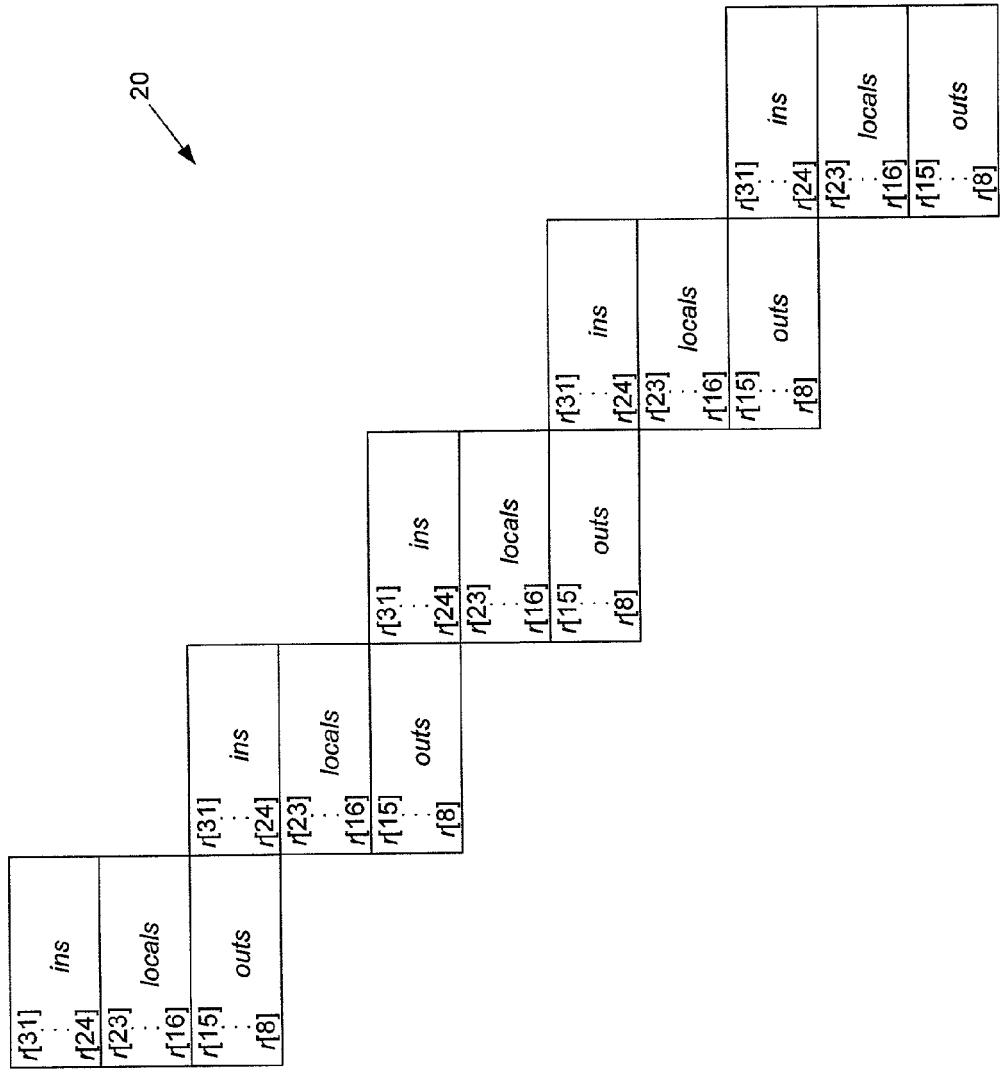
FIG. 2 shows a typical register window implementation.
Figure 3:
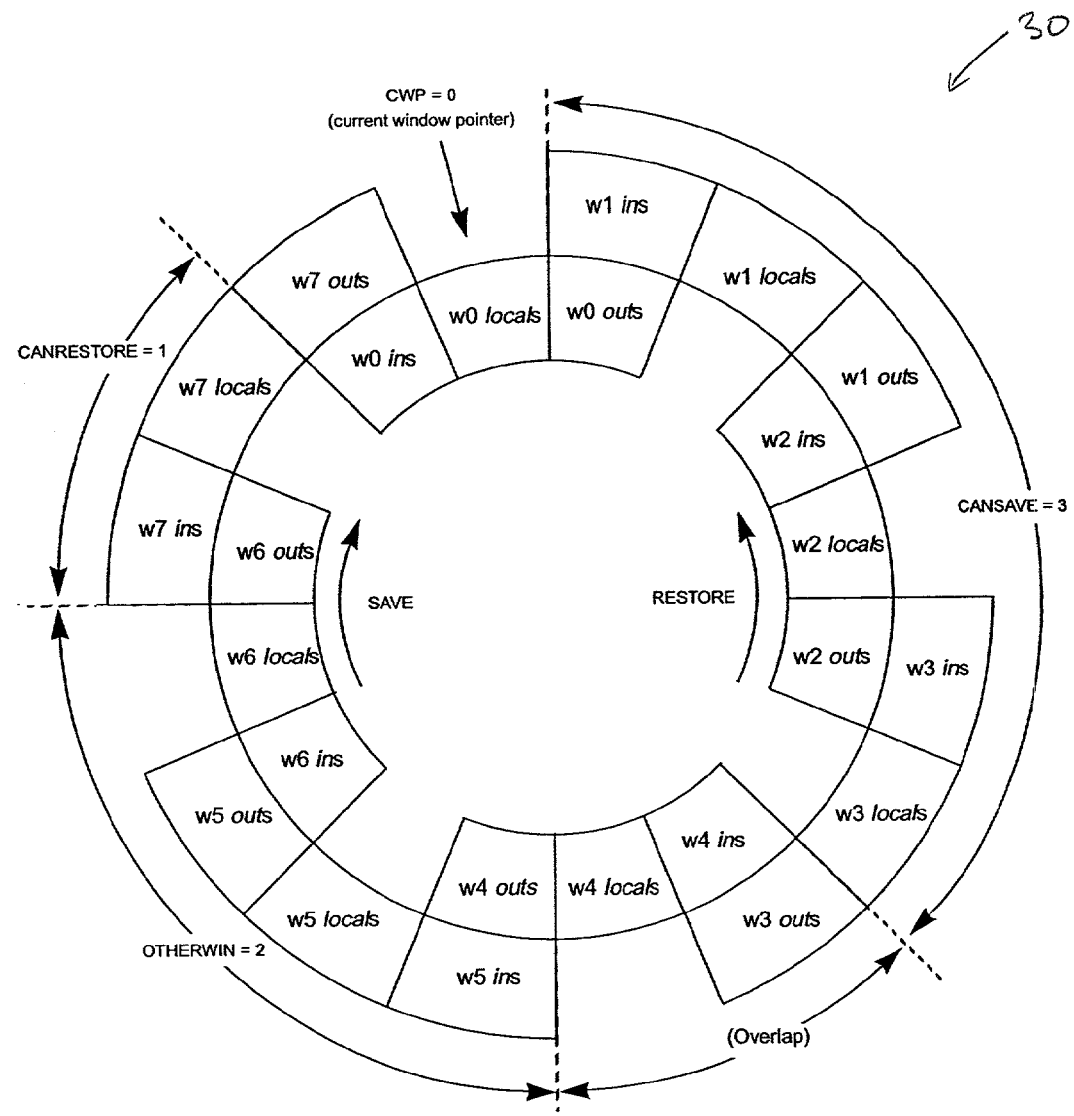
FIG. 3 shows another typical register window implementation.
Figure 4:
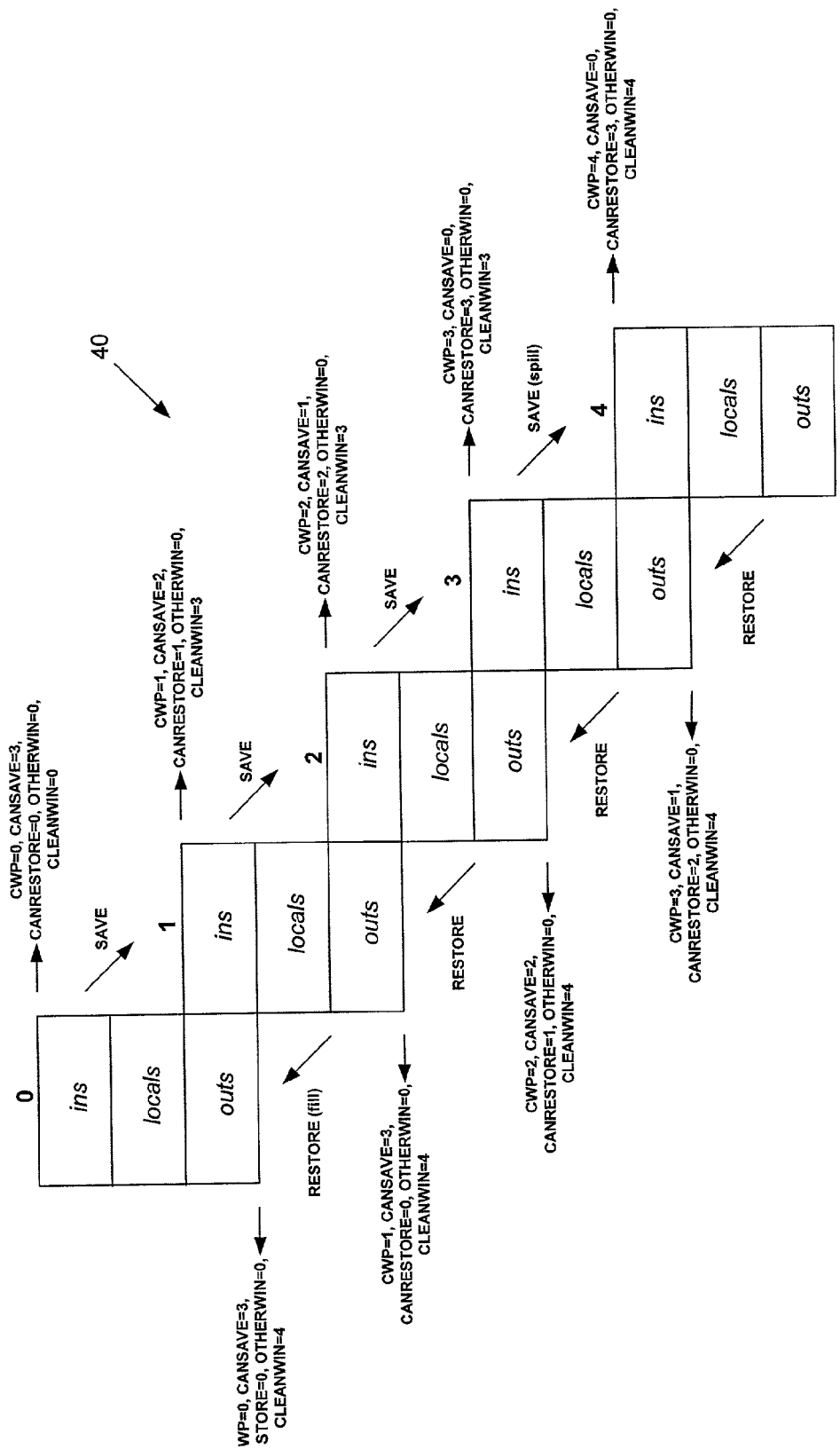
FIG. 4 shows a register window implementation in accordance with a description of an exemplary embodiment of the present invention.

FIG. 4 shows register values for an exemplary register window scheme 40 in accordance with a description of an embodiment of the present invention. In FIG. 4, the register values for CWP, CANSAVE, CANRESTORE, OTHERWIN, and CLEANWIN are shown with respect to SAVEs and RESTOREs of the register windows.

FIGS. 5a and 5b show exemplary register space in accordance with an embodiment of the present invention. Particularly, FIGS. 5a and 5b show 7-bit flattened values in both decimal and binary form of exemplary 5-bit architectural registers belonging to an exemplary instruction.

Figure 6A:
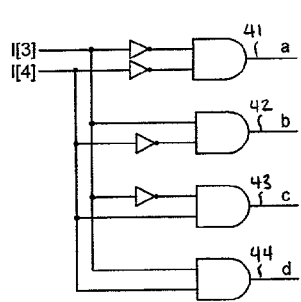
FIGS. 6a, 6b, and 6c show circuit diagrams in accordance with an embodiment of the present invention.
Figure 6B:
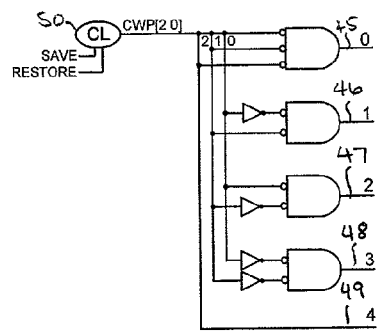
Figure 6C:
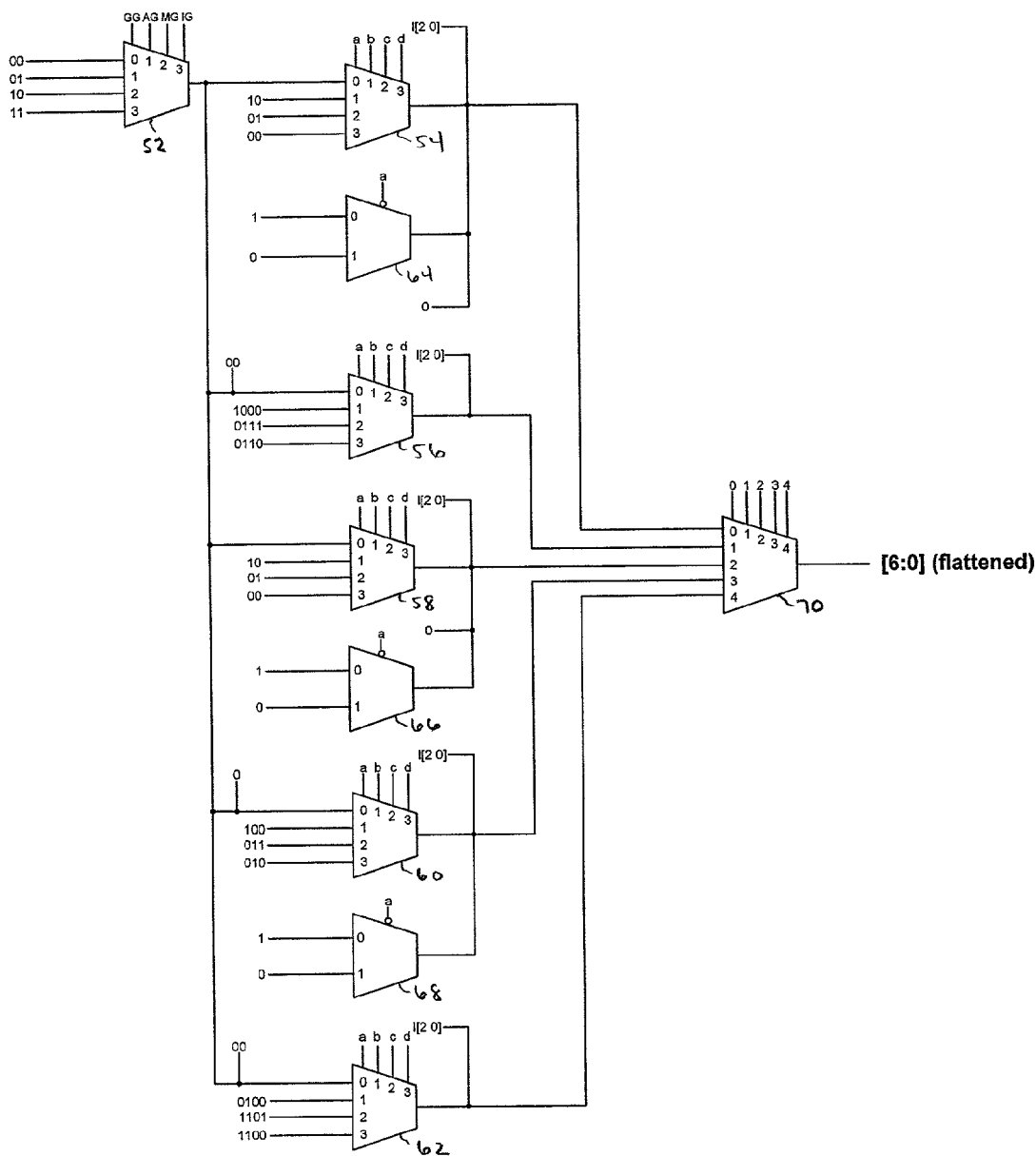

FIGS. 6a, 6b, and 6c show circuit diagrams in accordance with an embodiment of the present invention. Particularly, FIGS. 6a, 6b, and 6c show flattener logic that is used to flatten 5-bit architectural registers into 7-bit flattened space. In FIG. 6a, multiplexor select signals 41, 42, 43, and 44 for the circuit shown in FIG. 6c are generated using particular bits of a 5-bit architectural register, I. In FIG. 6b, multiplexor select signals 45, 46, 47, 48, and 49 for the circuit shown in FIG. 6c are generated using CWP, where CWP is responsive to SAVE/RESTORE instructions via particular combinational logic (CL) 50.

In FIG. 6c, a multiplexor 52 outputs based on a value of a global field in a processor state register. For example, if the interrupt global registers are being used in a particular register windowing scheme, select IG to multiplexor 52 is enabled. Selects GG (for global registers), AG (for alternate global registers), and MG (for memory global registers) to multiplexor 52 are similarly used. Select inputs to multiplexors 54, 56, 58, 60, and 62 are received from the circuit shown in FIG. 6a. Similarly, select inputs to multiplexors 64, 66, and 68 are also received from the circuit shown in FIG. 6a. Multiplexors 54, 56, 58, 60, 62, 64, 66, and 68 output to an output multiplexor 70 that receives select inputs from the circuit shown in FIG. 6b. The output multiplexor 70 outputs a 7-bit flattened value that is used to address I. Accordingly, because a 5-bit architectural register, such as I, has its own 7-bit flattened space, register dependency checking among instructions is made more efficient.

Those skilled in the art will note that by using the flattener logic shown in FIGS. 6a, 6b, and 6c, an 5-bit value of a register is flattened, i.e., converted, into an 7-bit value. In other embodiments, using similar logic, an n-bit value of a register may be flattened into an x-bit value, where x is greater than n. Thus, the register flattening principles presented in the present invention may be applied to various register architectures.

Figure 7A:
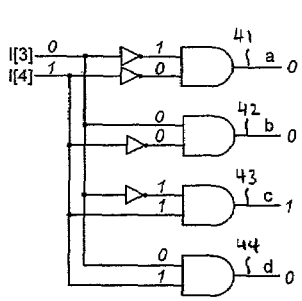
FIGS. 7a, 7b, and 7c show a trace of the circuit diagrams shown in FIGS. 6a, 6b, and 6c.
Figure 7B:
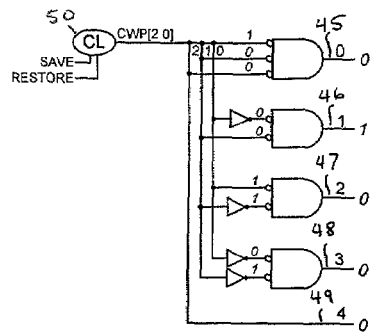
Figure 7C:
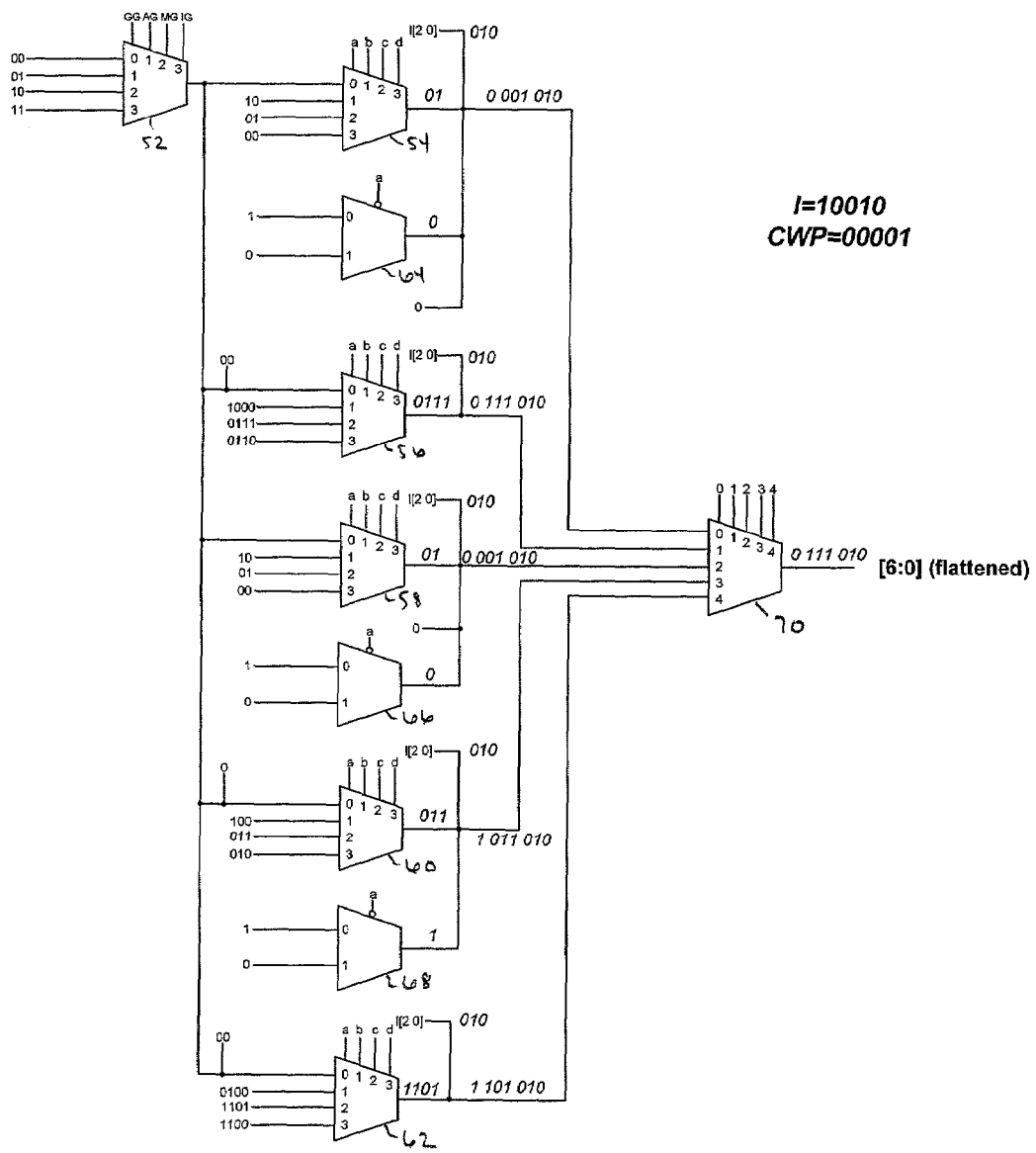

FIGS. 7a, 7b, and 7c show a trace of the circuit diagrams shown in FIGS. 6a, 6b, and 6c when I=18d=10010b and CWP=1d=00001b, where I is a 5-bit architectural register. Accordingly, as shown in FIGS. 7a, 7b, and 7c, a 7-bit flattened value of 0 111 010b=58d is generated using I. Thus, dependency checking may occur using 7-bit flattened space that is less interdependent than values used to address 5-bit architectural registers.

Further, those skilled in the art will appreciate that the flattened space formed by the flattener logic is used by a register dependency checker to check for dependencies among instructions. Thus, the dependency checking becomes simpler and more efficient without being adversely affected by register dependencies present in register windowing implementation.

In one or more embodiments of the present invention, a computer program (i.e., a computer readable medium) or software tool may be used to flatten register space using logic similar to that described above with reference to FIGS. 6a, 6b, and 6c. For example, instead of the flattening logic existing in hardware, the same logic may be implemented in software, where a computer program or other software tool interfaces with one or more registers of a register window.

Advantages of the present invention may include one or more of the following. In some embodiments, the ability to flatten register values of registers in a register window facilitates the simplification of instruction verification.

In some embodiments, because flattening logic is used to flatten address space associated with a register, dependency checking on one or more instructions using that register is simplified.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a plurality of instructions in a computer system, comprising:
    flattening an n-bit value stored in a first architectural register of a first instruction in a register window into an x-bit value dependent on a current window pointer to the register window, wherein x is greater than n, and wherein the x-bit value corresponds to the first architectural register;
    flattening a p-bit value stored in a second architectural register of a second instruction in the register window into a q-bit value dependent on the current window pointer, wherein q is greater than p, and wherein the q-bit value corresponds to the second architectural register; and
    checking a register dependency among the first instruction and the second instruction using the x-bit value and the q-bit value.

2. The method of claim 1, wherein flattening the n-hit value comprises:
    generating a first plurality of select signals dependent on the n-bit value;
    generating a second plurality of select signals dependent on the current window pointer; and
    generating the x-bit value dependent on the first plurality and second plurality of select signals.

3. A method for processing a plurality of instructions in a computer system, comprising:
    step for flattening an n-bit value stored in a first architectural register of a first instruction in a register window into an x-bit value dependent on a current window pointer to the register window, wherein x is greater than n, and wherein the x-bit value corresponds to the flit architectural register;
    step for flattening a p-bit value stored in a second architectural register of a second instruction in the register window into a q-bit value dependent on the current window pointer, wherein q is greater than p, and wherein the q-bit value corresponds to the second architectural register; and
    step for register dependency checking among the first instruction and the second instruction using the x-bit value and the q-bit value.

4. A computer system, comprising:
    a processor;
    a memory;
    instructions, residing in the processor and executable on the processor, for flattening an n-bit value in a first architectural register of a first instruction in a register window into an x-bit value dependent on a current window pointer to the register window, wherein x is greater than n, and wherein the x-bit value corresponds to the first architectural register;
    instructions, residing in the memory and executable on the processor, for flattening a p-bit value stored in a second architectural register of a second instruction in the register window into a q-bit value dependent on the current window pointer, wherein q is greater than p, and wherein q-bit value corresponds to the second architectural register; and
    instructions, residing in the memory and executable on the processor, for using the x-bit value and the q-bit value to check for a dependency among the first instruction and the second instruction.

5. A computer-readable medium having recorded therein instructions executable by processing, the instructions for:
    flattening an n-bit value stored in a first architectural register of a first instruction in a register window into an x-bit value dependent on a current window pointer to the register window, wherein x is greater than n, and wherein the x-bit value corresponds to the first architectural register;
    flattening a p-bit value stored in a second architectural register of a second instruction in the register window into a q-bit value dependent on the current window pointer, wherein q is greater than p, and wherein the q-bit value corresponds to the second architectural register; and
    register dependency checking among the first instruction and the second instruction using the x-bit value and the q-bit value.

* * * * *

UNITED STATES PATENT AND TRADEMARK OFFICE
CERTIFICATE OF CORRECTION

| | | |
|---|---|---|
| PATENT NO. | : 7,080,237 B2 | Page 1 of 1 |
| APPLICATION NO. | : 10/155391 | |
| DATED | : July 18, 2006 | |
| INVENTOR(S) | : Chandra M. R. Thimmannagari et al. | |

It is certified that error appears in the above-identified patent and that said Letters Patent is hereby corrected as shown below:

In the Claims:

In Claim 2, column 5 (Line 60), replace "n-hit" with --n-bit--.

Signed and Sealed this

Seventh Day of November, 2006

JON W. DUDAS
*Director of the United States Patent and Trademark Office*